United States Patent [19]

Simbal

[11] Patent Number: 5,087,987
[45] Date of Patent: Feb. 11, 1992

[54] COLOR-CORRECTED TELECENTRIC SCAN LENS

[75] Inventor: John J. Simbal, Woodbury, Minn.

[73] Assignee: Minnesota Mining and Manufacturing Company, St. Paul, Minn.

[21] Appl. No.: 676,817

[22] Filed: Mar. 28, 1991

[51] Int. Cl.⁵ .............................................. G02T 13/22
[52] U.S. Cl. .................................... 359/663; 359/739; 359/761; 359/770
[58] Field of Search .............. 350/415, 409, 463, 464, 350/449

[56] References Cited

U.S. PATENT DOCUMENTS

| | | | |
|---|---|---|---|
| 2,855,824 | 10/1958 | Schade | 350/415 |
| 4,396,254 | 8/1983 | Shibuya | 350/463 |
| 4,682,863 | 7/1987 | Simbal | 350/463 |

Primary Examiner—Bruce Y. Arnold
Assistant Examiner—Rebecca D. Gass
Attorney, Agent, or Firm—Gary L. Griswold; Walter N. Kirn; Walter C. Linder

[57] ABSTRACT

A diffraction limited, f/6.0, 71.0 mm focal length telecentric scan lens which is color-corrected for 780 nm, 830 nm and 890 nm wavelengths. The lens includes, in succession from a side of incident light:

a first negative meniscus lens element, concave toward the incident light side;

a second positive meniscus lens element, concave toward the incident light side;

a first plano-convex lens element, convex away from the incident light side;

a second plano-convex lens element, convex toward the incident light side;

a first cemented doublet including bi-concave and plano-convex lens elements, the cemented surface convex toward the incident light side; and a second cemented doublet including plano-concave and plano-convex lens elements, the cemented surface convex toward the incident light side.

10 Claims, 10 Drawing Sheets

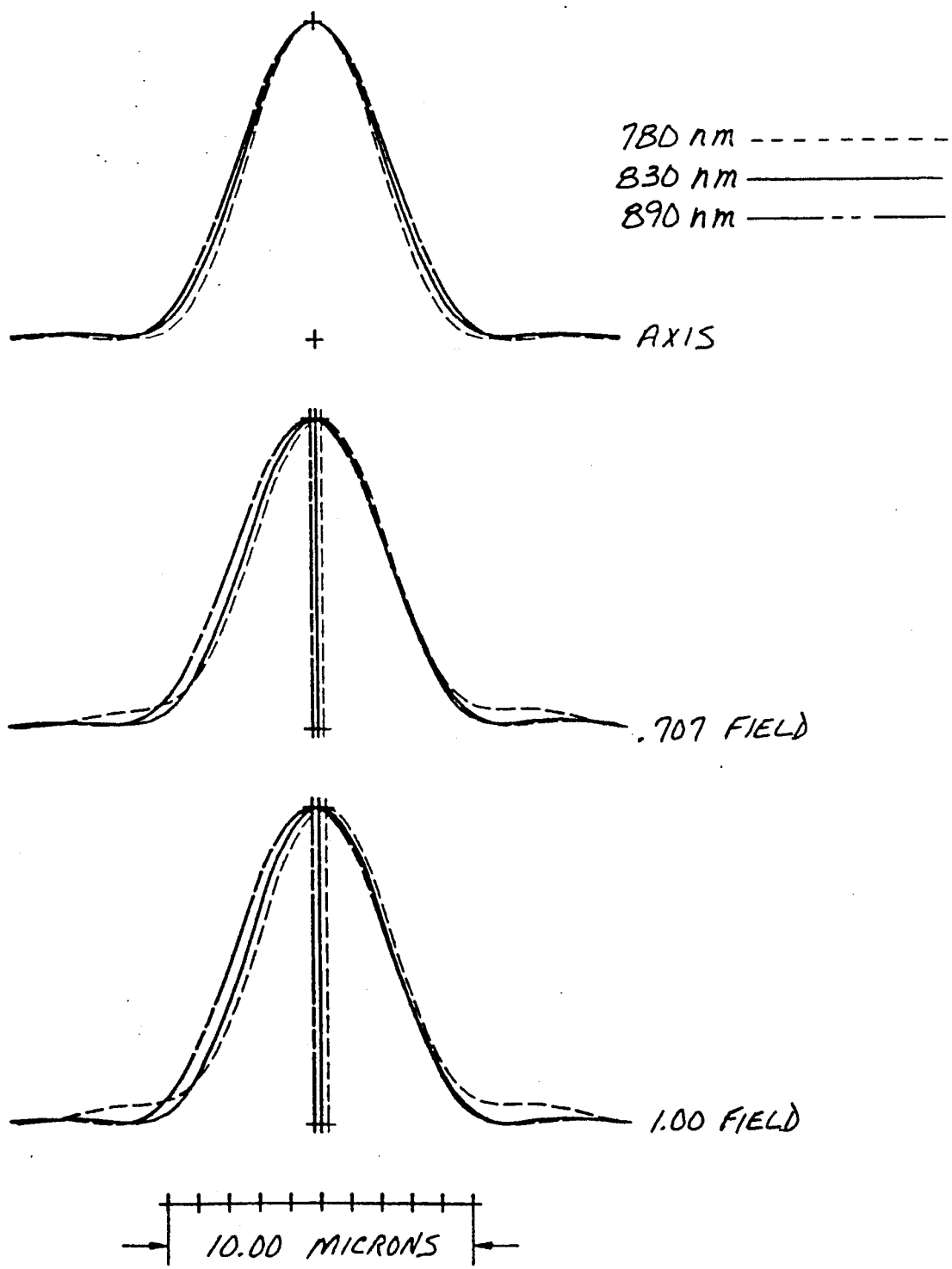

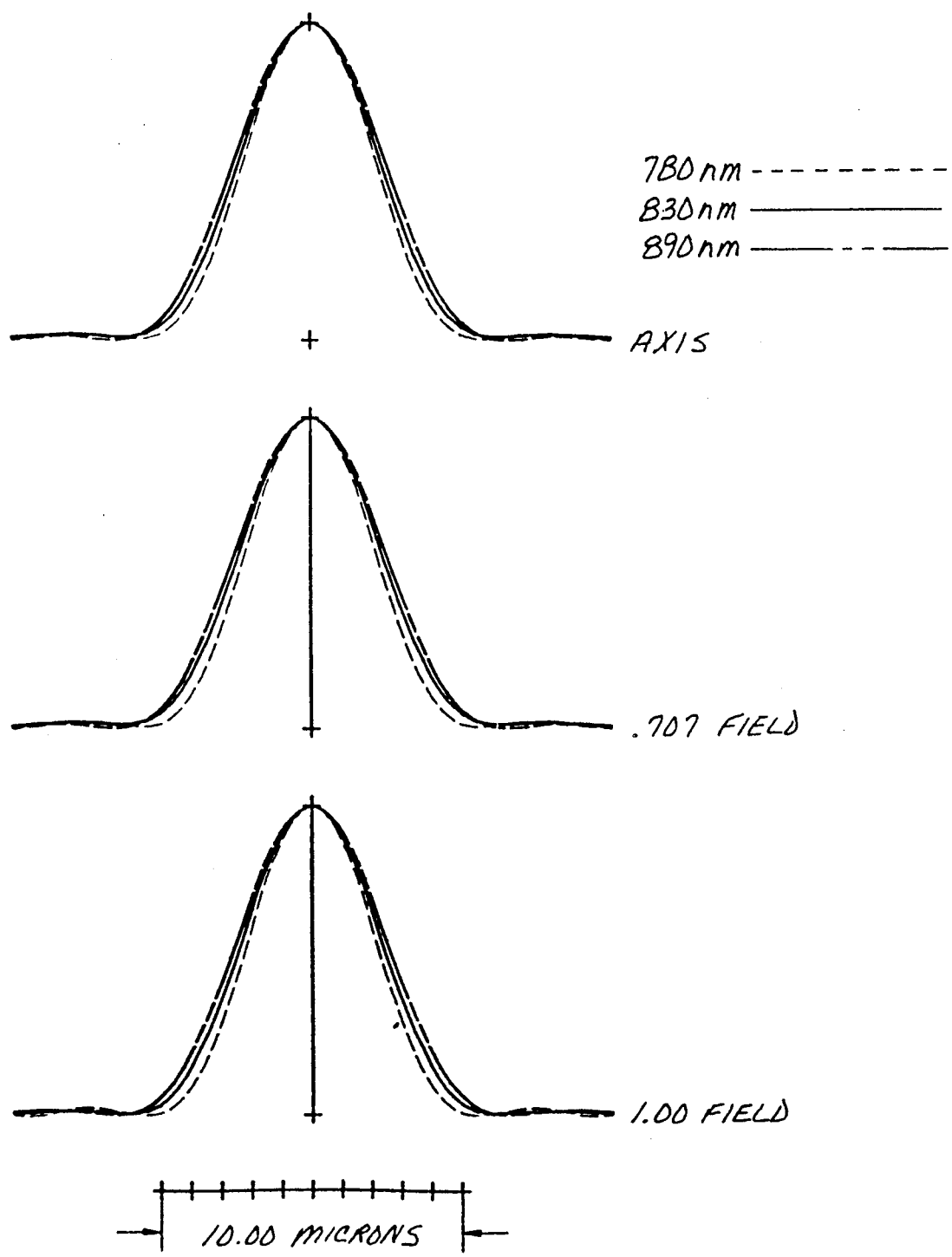

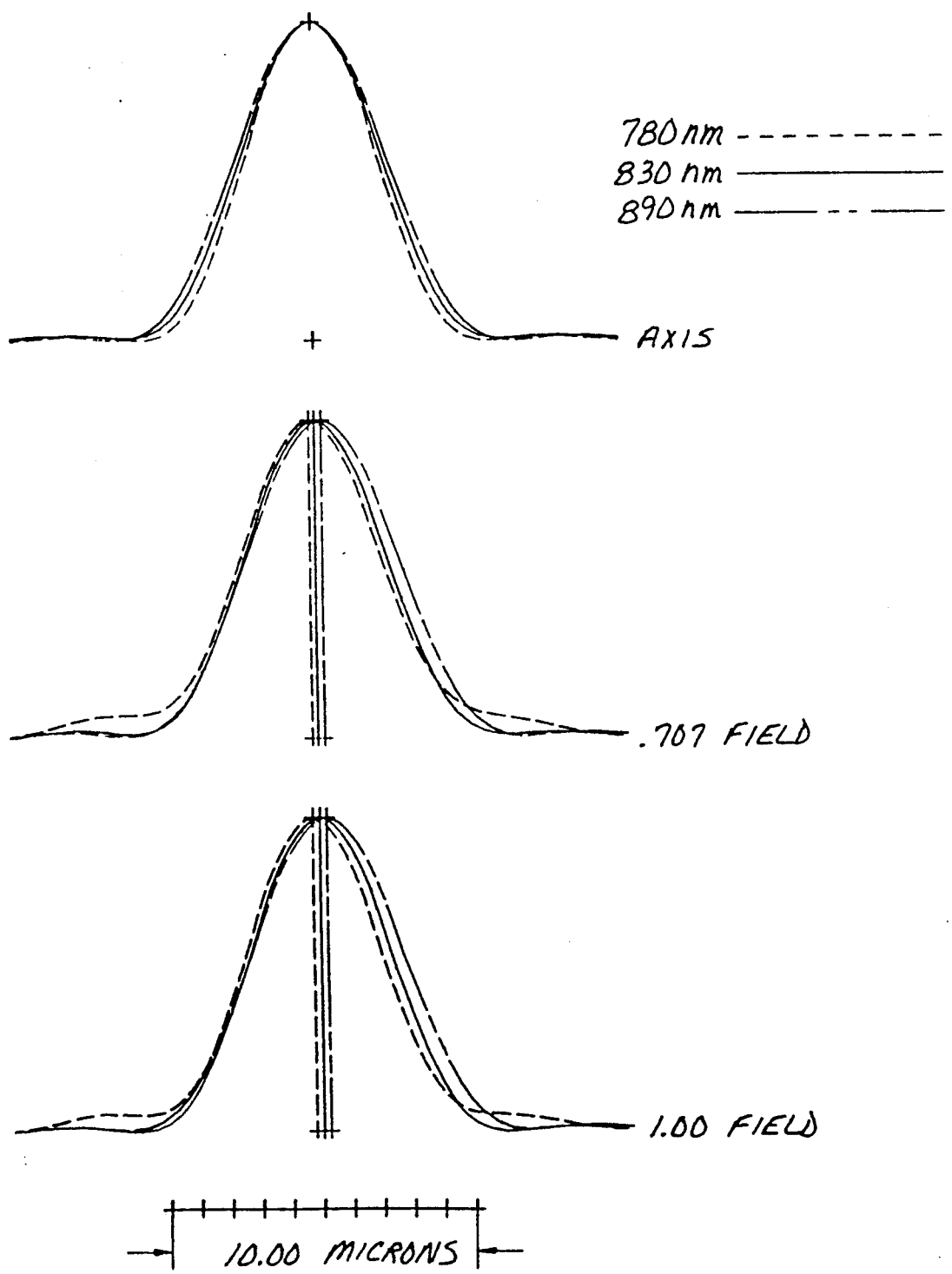

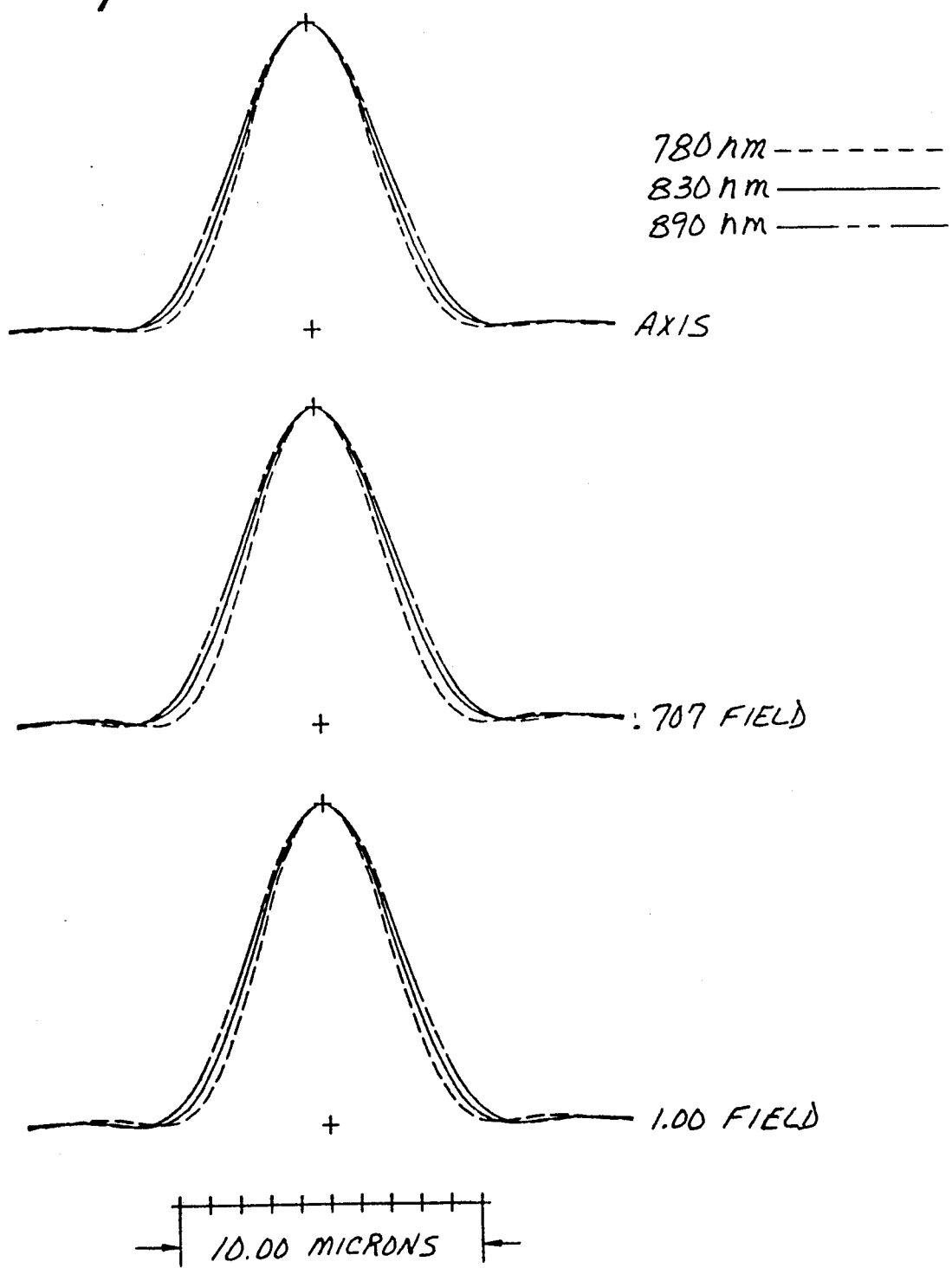

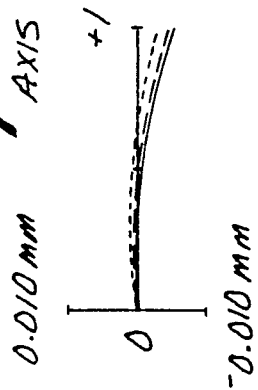
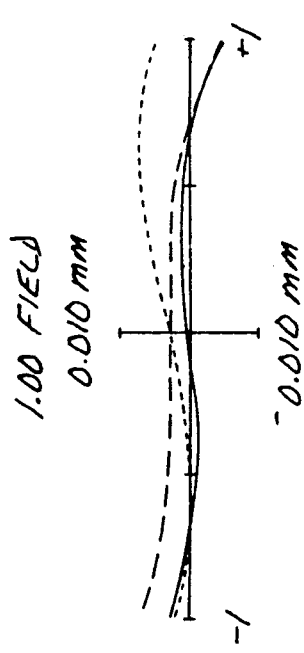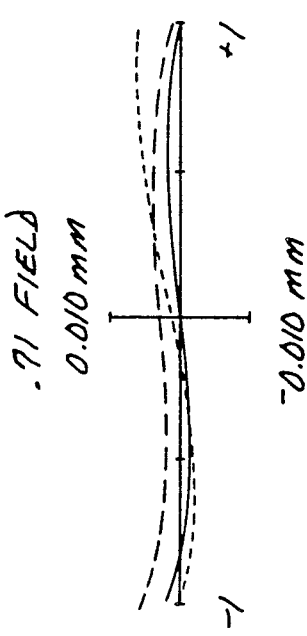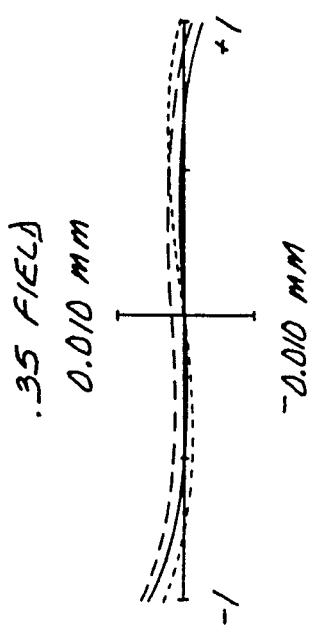

Fig. 5B
RADIAL
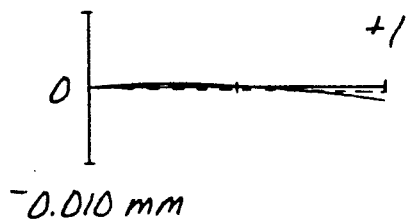
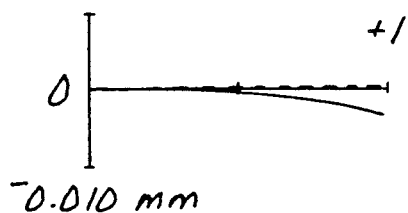
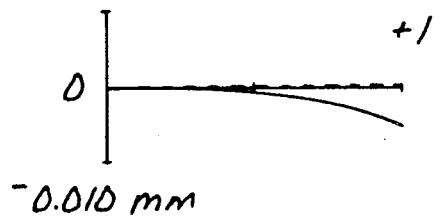
DELZ ———
DELY - - - - - - -

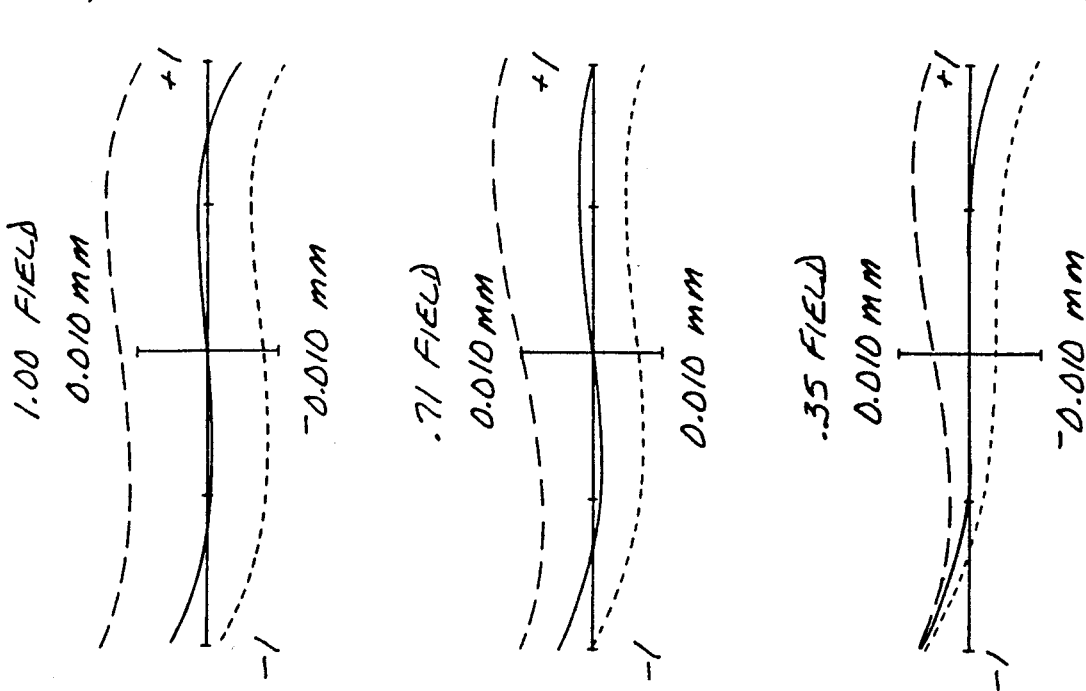

Fig. 6B
RADIAL
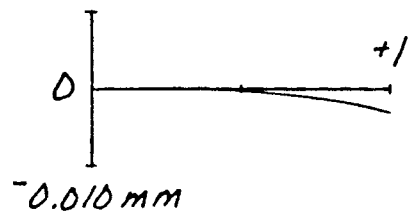
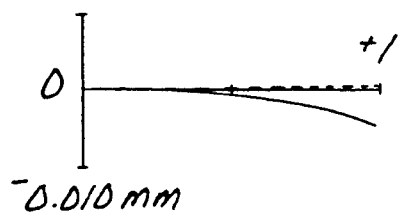
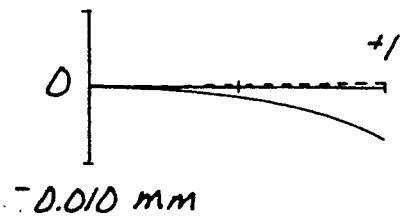
DEL Z ———
DEL Y - - - - - -

5,087,987

COLOR-CORRECTED TELECENTRIC SCAN LENS

BACKGROUND OF THE INVENTION

The present invention relates generally to lenses. In particular, the present invention is a color-corrected telecentric lens used in an optical scanning system.

Scan lenses are commonly used to focus laser beams onto an image plane in optical scanning systems. The scan lens is normally positioned between a pupil and the image plane in systems of this type. Typically, a rotating mirror located at the pupil scans the laser beams across the incident side of the lens. Because of its telecentric nature, the laser beams emerging from the lens are substantially parallel to the optical axis and therefore perpendicular to the image plane at all points along the scan.

Color scanning systems typically include three lasers for generating laser beams at three different wavelengths. The scan lens used in such a color scanning system must be capable of focusing all three laser beams onto the image plane. This design constraint imposes severe conditions upon lens designers since the optical properties of a lens are functionally related to the wavelength of light being propagated therethrough, a property known as chromatic aberration. Known color corrected scan lenses such as that disclosed in the Shibuya U.S. Pat. No. 4,396,254 often use exteme glasses with relatively low indices of refraction and high Abbe numbers (greater than 80). Glasses of this type are undesirable since they are relatively expensive, prone to striae, and often prone to straining.

There is, therefore, a continuing need for improved color-corrected telecentric scan lenses. A high performance scan lens having diffraction limited optical characteristics and a low f/ number (to provide small spot size) is desired. To be commercially viable, the lens should also be durable and relatively inexpensive to manufacture.

SUMMARY OF THE INVENTION

The present invention is a fast and durable color-corrected telecentric scan lens which can be relatively inexpensively manufactured. The lens includes, in succession from a side of incident light, the following lens elements:

1) a first meniscus lens element, concave toward the incident light side;
2) a second meniscus lens element, concave toward the incident light side;
3) a first plano-convex lens element, convex away from the incident light side;
4) a second plano-convex lens element, convex toward the incident light side; and
5) a first cemented doublet including bi-concave and plano-convex lens elements, the cemented surface convex toward the incident light side.

In other embodiments the scan lens also includes a second cemented doublet opposite the first cemented doublet from the incident light side. The second cemented doublet includes plano-concave and plano-convex lens elements with the cemented surface convex toward the incident light side.

The lens can be configured as an f/6.0 lens having a 71.009 mm focal length. The lens offers diffraction limited, "zero vignetting" performance for a 14° scan angle. The lens elements are fabricated from relatively inexpensive glasses having low Abbe numbers (less than 53.0). Since all the lens elements can have an axial thickness to diameter ratio greater than 10%, the lens can also be efficiently manufactured.

BRIEF DESCRIPTION OF THE DRAWINGS

FIG. 2A is a graph of normalized point spread profiles of laser beams of 780, 830 and 890 nm wavelengths at 3 points along the radial direction (Y-axis) of the lens shown in FIG. 1.

FIG. 2B is a graph of normalized point spread profiles of laser beams of 780, 830 and 890 nm wavelengths at 3 points along the tangential direction (X-axis) of the lens shown in FIG. 1.

FIG. 4A is a graph of normalized point spread profiles of laser beams of 780, 830 and 890 nm wavelengths at 3 points along the radial direction (Y-axis) of the lens shown in FIG. 3.

FIG. 4B is a graph of normalized point spread profiles of laser beams of 780, 830 and 890 nm wavelengths at 3 points along the tangential direction (X-axis) of the lens shown in FIG. 3.

FIG. 5A is a graph of tangential ray intercept curves for laser beams of 780, 830 and 890 nm wavelengths at three field points of the lens shown in FIG. 3.

FIG. 5B is a graph of radial ray intercept curves for laser beams of 780, 830 and 890 nm wavelengths at three field points of the lens shown in FIG. 3.

FIG. 5C is a graph of ray intercept curves for laser beams of 780, 830 and 890 nm wavelengths on axis of the lens shown in FIG. 3.

FIG. 6A is graph of tangential ray intercept curves for laser beams of 780, 830 and 890 nm wavelengths at three field points of the lens shown in FIG. 3 without lens elements 107 and 108.

FIG. 6B is a graph of radial ray intercept curves for laser beams of 780, 830 and 890 nm wavelengths at three field points of the lens shown in FIG. 3 without lens elements 107 and 108.

FIG. 6C is a graph of ray intercept curves for laser beams of 780, 830 and 890 nm wavelengths on axis of the lens shown in FIG. 3 without lens elements 107 and 108.

DETAILED DESCRIPTION OF THE PREFERRED EMBODIMENTS

Figure 1:
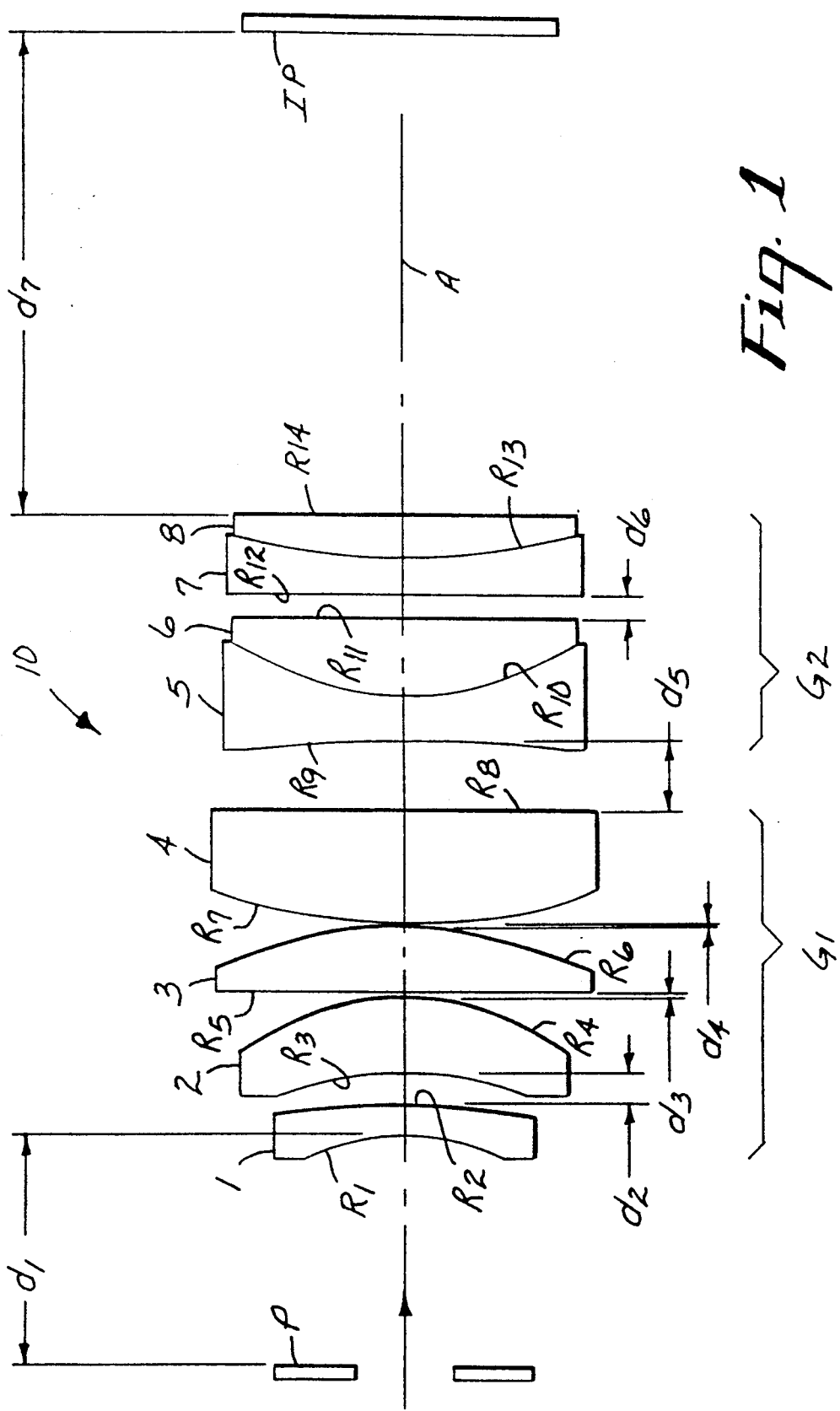
FIG. 1 is an illustration of a color-corrected telecentric scan lens in accordance with a first embodiment of the present invention.
Figure 3:
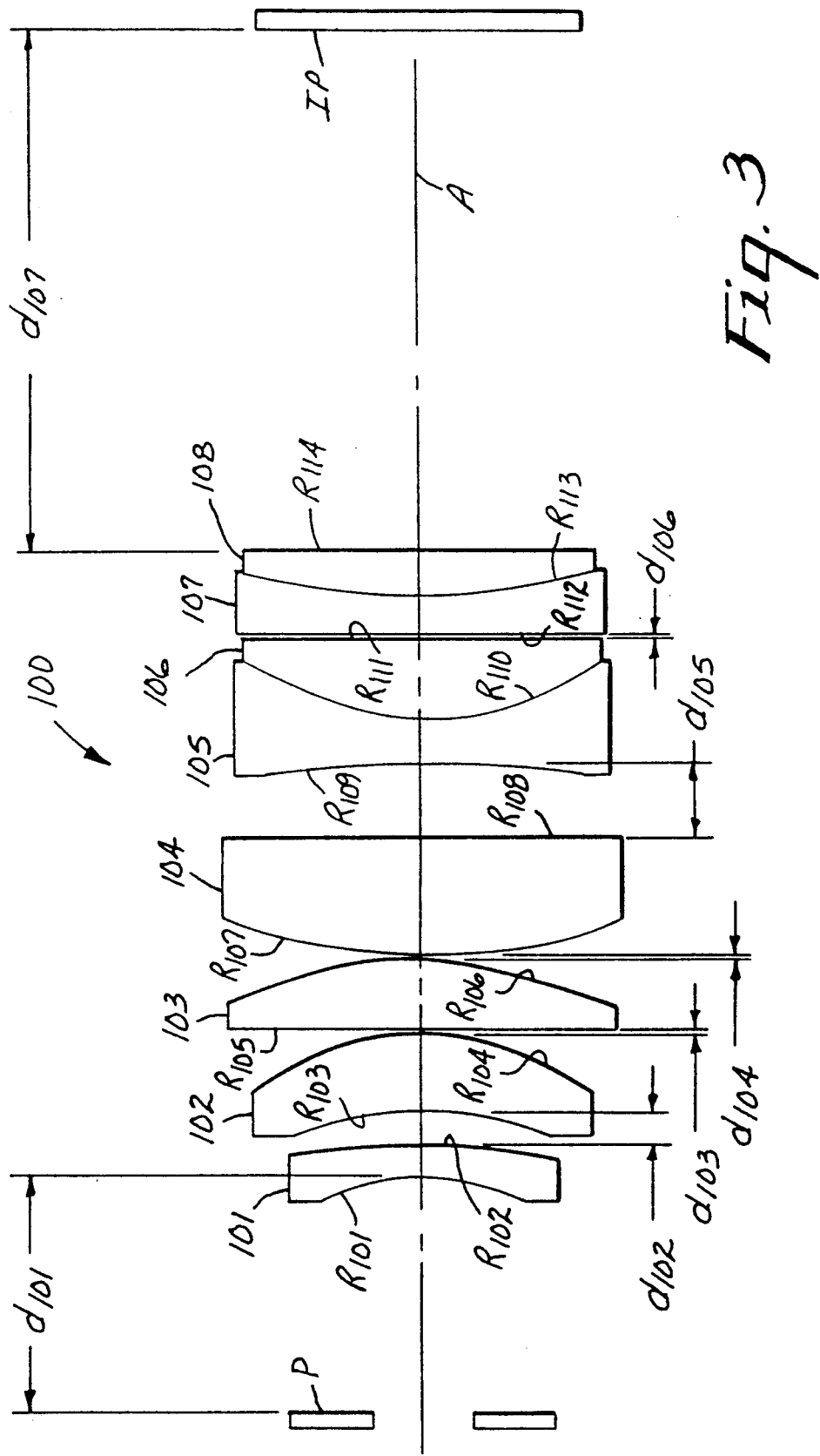
FIG. 3 is an illustration of a color-corrected telecentric scan lens in accordance with a second embodiment of the present invention.

Color-corrected telecentric scan lens 10, a first embodiment of the present invention, is illustrated in FIG. 1. Lens 10 is an f/6.0, 71.009 mm focal length lens formed from lens elements 1-8 which are positioned in two groups $G_1$ and $G_2$. Scan lens 10 is shown positioned about optical axis A between an aperture or pupil P and an image plane IP. A rotating mirror or other scanning mechanism (not shown) directs an incident beam of laser radiation through pupil P and impinges the incident beam onto lens element 1. After being successively propagated through lens elements 1-8, the emergent beam from scan lens 10 is focused onto image plane IP.

Group $G_1$ includes lens elements 1-4, all of which are airspaced singlet elements. Lens element 1 is spaced from pupil P by distance $d_1$, and is a meniscus lens element with surfaces of radii $R_1$ and $R_2$ oriented in such a manner that it is concave toward the side of incident light (i.e. concave toward pupil P. In preferred embodiments, lens element 1 is a negative meniscus lens element. Lens element 2 is also a meniscus lens element oriented concave toward the incident light side, and is spaced from lens element 1 by distance $d_2$. Meniscus lens element 2 has surfaces of radii $R_3$ and $R_4$, and is preferably a positive meniscus lens element. Lens element 3 is a plano-convex element convex away from the incident light side and having surfaces identified by radii $R_5$ and $R_6$. A distance $d_3$ separates lens element 3 from lens element 2. Lens element 4 is also a plano-convex lens element, but is convex toward the incident light side. Lens element 4 has surfaces of radii $R_7$ and $R_8$, and is separated from lens element 3 by a distance $d_4$.

Lens group $G_2$ includes two airspaced cemented doublets, the first formed from lens elements 5 and 6, and the second formed from lens elements 7 and 8. Lens element 5 is a bi-concave lens element having surfaces of radii $R_9$ and $R_{10}$, and is spaced from lens element 4 by distance $d_5$. Lens element 6 is a plano-convex element having surfaces of radii $R_{10}$ and $R_{11}$. The convex surface of lens element 6 is cemented to a concave surface of lens element 5, forming a doublet having a cemented surface oriented convex toward the incident light side. Lens element 7 is a plano-concave element having surfaces of radii $R_{12}$ and $R_{13}$. Lens element 7 is spaced from lens element 6 by distance $d_6$. Lens element 7 is a plano-convex element having surfaces of radii $R_{13}$ and $R_{14}$. The convex surface of lens element 8 is cemented to the concave surface of lens element 7, forming a doublet having a convex cemented surface oriented toward the incident light side. Lens element 8 is spaced from image plane IP by distance $d_7$.

As mentioned above, lens 10 is configured as an f/6.0, 71.009 mm (i.e., 71 mm) focal length lens in one embodiment. Numerical characteristics for this embodiment of scan lens 10 are specified below in Table I. The lens element, spacing and surface reference characters used in Table I correspond to the reference characters in FIG. 1. Distances $d_1$–$d_7$ correspond to the successive distances between pupil P and lens element 1, the distances between lens elements 1-5 and 6 and 7, and the distance between lens element 8 and image plane IP. Surface radii $R_1$–$R_{14}$ are the radii of curvature of the surfaces of lens elements 1-8 in succession from the incident light side, with negative (−) radii indicative of surfaces which are concave toward the side of incident light or convex away from the incident light side. All distances, radii and thicknesses are specified in millimeters (mm). The specified thicknesses of lens elements 1-8 are the thicknesses on the central optical axis A. The indices of refraction $N_d$ of the glasses from which lens elements 1-8 are fabricated are specified for the Sodium d line. $V_d$ is the Abbe number or dispersion factor of the associated lens element.

TABLE I

| Lens Element & Spacing | Surface | Radius (mm) | Thickness & Distance (mm) | $N_d$ | $V_d$ |
| --- | --- | --- | --- | --- | --- |
| $d_1$ | | | 28.00 | | |
| | $R_1$ | −27.309 | | | |
| 1 | | | 3.76 | 1.80518 | 25.4 |
| | $R_2$ | −118.949 | | | |
| $d_2$ | | | 3.78 | | |
| | $R_3$ | −44.651 | | | |
| 2 | | | 8.98 | 1.77250 | 49.7 |
| | $R_4$ | −35.608 | | | |
| $d_3$ | | | 0.51 | | |

TABLE I-continued

| Lens Element & Spacing | Surface | Radius (mm) | Thickness & Distance (mm) | $N_d$ | $V_d$ |
| --- | --- | --- | --- | --- | --- |
| | $R_5$ | plano | | | |
| 3 | | | 8.13 | 1.74950 | 35.3 |
| | $R_6$ | −55.189 | | | |
| $d_4$ | | | 0.25 | | |
| | $R_7$ | 74.844 | | | |
| 4 | | | 13.53 | 1.74100 | 52.7 |
| | $R_8$ | plano | | | |
| $d_5$ | | | 8.65 | | |
| | $R_9$ | −175.668 | | | |
| 5 | | | 5.39 | 1.80518 | 25.4 |
| | $R_{10}$ | 40.287 | | | |
| 6 | | | 9.20 | 1.74100 | 52.7 |
| | $R_{11}$ | plano | | | |
| $d_6$ | | | 3.01 | | |
| | $R_{12}$ | plano | | | |
| 7 | | | 4.60 | 1.76182 | 26.5 |
| | $R_{13}$ | 91.740 | | | |
| 8 | | | 4.70 | 1.74100 | 52.7 |
| | $R_{14}$ | plano | | | |
| $d_7$ | | | 59.51 | | |

The preferred embodiment of scan lens 10 described above is nearly telecentric and has chief rays at full field within three degrees of being parallel to central optical axis A. Scan lens 10 is also color-corrected for 780 nm, 830 nm and 890 nm wavelengths. At f/6.0, diffraction modulation transfer function (MTF) analysis indicates the spot sizes for all three 780, 830 and 890 nm wavelength beams approach the diffraction limit across the field, with RMS wavefront errors under 0.07 waves. Normalized peak spot intensities of lens 10 for beam wavelengths of 780, 830 and 890 nm as computed by diffraction MTF analysis on the central optical axis A, at 0.707 full field and at full field in both the radial (Y-axis) and tangential (X-axis) directions are shown in FIGS. 2A and 2B, respectively. The highly color-corrected characteristics of scan lens 10 are especially evident in the small separation (less than 0.5 microns) between the spots formed by the three wavelengths at 0.707 and 1.000 field.

Scan lens 10 is durable and can be relatively inexpensively manufactured. Because of the relatively high indices of refraction $N_d$ and the relatively low Abbe numbers $V_d$ of lens elements 1-8, these elements can be fabricated from relatively inexpensive optical materials which are resistant to striae and staining. When configured for a scan angle of ±14°, the free apertures of lens elements 1-8 can be determined for "zero vignetting" performance. Even with four millimeters added to the diameter of the free apertures of lens elements 1-8, each element still has an edge thickness of over two millimeters. This alleviates difficulties which can otherwise arise when manufacturing lens elements with "knife edges." Furthermore, the axial thickness of each lens element 1-8 is greater than 10% of its diameter, thereby avoiding problems commonly associated with holding figure on extremely thin lens elements. The diameters of lens elements 1-8, including the free aperture and a two millimeter edge surrounding the aperture, is given below in Table II.

TABLE II

| Lens Element | Diameter (mm) |
| --- | --- |
| 1 | 32.5 |
| 2 | 41.0 |
| 3 | 47.0 |

TABLE II-continued

| Lens Element | Diameter (mm) |
| --- | --- |
| 4 | 48.1 |
| 5 | 45.1 |
| 6 | 43.1 |
| 7 | 44.4 |
| 8 | 42.4 |

It is to be understood that deviations from the preferred specifications of scan lens 10 given above (e.g., scaling or the introduction of a slight amount of power in the plano surfaces) can be incorporated into the lens without departing from the spirit and scope of the invention. By way of specific example, color-corrected telecentric scan lens 100, a second embodiment of the present invention, is illustrated in FIG. 2. Scan lens 100 is an f/6.0, 71.004 mm (i.e., 71 mm) scan lens formed from lens elements 101-108. Lens elements 101-108 are identical in nature to their counterparts in scan lens 10, although their numerical characteristics are somewhat different. The numerical characteristics of scan lens 100 are specified below in Tables III and IV. The normalized peak spot intensities of lens 100 about the Y-axis (radial) and X-axis (tangential) directions are illustrated in FIGS. 4A and 4B, respectively. Graphs of tangential and radial ray intercept curves of lens 100 for laser beams of 780, 830 and 890 nm wavelengths at three field points are shown in FIGS. 5A and 5B, respectively. FIG. 5C is a graph of ray intercept curves for laser beams of 780, 830 and 890 nm wavelengths on the optical axis of lens 100. Although the performance of scan lens 20 is not quite as optimum as that of scan lens 10, its performance is adequate for many applications and it offers all the advantages of lens 10 described above.

TABLE III

| Lens Element & Spacing | Surface | Radius (mm) | Thickness & Distance d (mm) | $N_d$ | $V_d$ |
| --- | --- | --- | --- | --- | --- |
| $d_{101}$ | | | 28.0 | | |
| | $R_{101}$ | −27.087 | | | |
| 101 | | | 4.10 | 1.80518 | 25.4 |
| | $R_{102}$ | −116.937 | | | |
| $d_{102}$ | | | 3.81 | | |
| | $R_{103}$ | −44.651 | | | |
| 102 | | | 9.04 | 1.77250 | 49.7 |
| | $R_{104}$ | −35.608 | | | |
| $d_{103}$ | | | 0.40 | | |
| | $R_{105}$ | plano | | | |
| 103 | | | 8.00 | 1.74950 | 35.3 |
| | $R_{106}$ | −55.189 | | | |
| $d_{104}$ | | | 0.26 | | |
| | $R_{107}$ | 74.844 | | | |
| 104 | | | 10.32 | 1.74100 | 52.7 |
| | $R_{108}$ | plano | | | |
| $d_{105}$ | | | 8.74 | | |
| | $R_{109}$ | −175.668 | | | |
| 105 | | | 5.48 | 1.80518 | 25.4 |
| | $R_{110}$ | 42.520 | | | |
| 106 | | | 9.20 | 1.74100 | 52.7 |
| | $R_{111}$ | plano | | | |
| $d_{106}$ | | | 0.25 | | |
| | $R_{112}$ | plano | | | |
| 107 | | | 4.60 | 1.76182 | 26.5 |
| | $R_{113}$ | 93.003 | | | |
| 108 | | | 4.70 | 1.74100 | 52.7 |
| | $R_{114}$ | plano | | | |
| $d_{107}$ | | | 65.10 | | |

TABLE IV

| Lens Element | Diameter (mm) |
| --- | --- |
| 101 | 34.0 |
| 102 | 42.3 |
| 103 | 48.2 |
| 104 | 49.3 |
| 105 | 46.7 |
| 106 | 44.7 |
| 107 | 46.2 |
| 108 | 44.2 |

Other embodiments of the invention (not shown) are similar to scan lenses 10 and 100 described above, but do not include the doublet formed by lens elements 7 and 8 (of lens 10) or 107 and 108 (of lens 100). These doublets in lenses 10 and 100 have little optical power, but provide some correction for chromatic aberration, especially for the 780 nm and 890 nm wavelength beams, respectively, As evidenced by FIGS. 6A-6C, the commercially advantageous features of scan lens 100 are still present in an embodiment which does not include the second doublet formed from lens elements 107 and 108, respectively, especially for monochromatic or near monochromatic applications. FIGS. 6A-6C are tangential, radial and axial ray intercept curves, respectively, for scan lens 100 without the doublet formed by lens elements 107 and 108. This embodiment of lens 100 has a focal length of 70.4 mm (i.e., 70 mm).

Although the present invention has been described with reference to preferred embodiments, those skilled in the art will recognize that other changes may be made in form and detail without departing from the spirit and scope of the invention.

What is claimed is:

1. A multiple element telecentric scan lens comprising, in succession from a side of incident light:
   a first meniscus lens element, concave toward the incident light side;
   a second meniscus lens element, concave toward the incident light side;
   a first plano-convex lens element, convex away from the incident light side;
   a second plano-convex lens element, convex toward the incident light side; and
   a first cemented doublet including bi-concave and plano-convex lens elements, the cemented surface convex toward the incident light side.

2. The scan lens of claim 1 wherein the lens is an f/6.0 lens with numerical characteristics substantially as follows:

| Lens Element & Spacing | Surface | Radius (mm) | Thickness & Distance (mm) | $N_d$ | $V_d$ |
| --- | --- | --- | --- | --- | --- |
| | $R_1$ | −27.309 | | | |
| 1 | | | 3.76 | 1.80518 | 25.4 |
| | $R_2$ | −118.949 | | | |
| $d_2$ | | | 3.78 | | |
| | $R_3$ | −44.651 | | | |
| 2 | | | 8.98 | 1.77250 | 49.7 |
| | $R_4$ | −35.608 | | | |
| $d_3$ | | | 0.51 | | |
| | $R_5$ | plano | | | |
| 3 | | | 8.13 | 1.74950 | 35.3 |
| | $R_6$ | −55.189 | | | |
| $d_4$ | | | 0.25 | | |
| | $R_7$ | 74.844 | | | |
| 4 | | | 13.53 | 1.74100 | 52.7 |
| | $R_8$ | plano | | | |

-continued

| Lens Element & Spacing | Surface | Radius (mm) | Thickness & Distance (mm) | $N_d$ | $V_d$ |
|---|---|---|---|---|---|
| $d_5$ | | | 8.65 | | |
| | $R_9$ | −175.668 | | | |
| 5 | | | 5.39 | 1.80518 | 25.4 |
| | $R_{10}$ | 40.287 | | | |
| 6 | | | 9.20 | 1.74100 | 52.7 |
| | $R_{11}$ | plano | | | | wherein:
numbers 1-6 refer to the lens elements in succession from the side of incident light;
spacings $d_2$-$d_5$ refer to the distances between lens elements 1-5;
surfaces $R_1$-$R_{11}$ refer to the surfaces of the lens elements in succession from the incident light side;
$N_d$ refers to the refractive indices of the lens elements at the sodium d line; and
$V_d$ refers to the Abbe numbers of the materials of the lens elements.

3. The scan lens of claim 2 and further comprising a second cemented doublet opposite the first cemented doublet from the incident light side, the second cemented doublet including plano-concave and plano-convex lens elements with the cemented surface convex toward the incident light side, with numerical characteristics substantially as follows:

| Lens Element & Spacing | Surface | Radius (mm) | Thickness & Distance (mm) | $N_d$ | $V_d$ |
|---|---|---|---|---|---|
| $d_6$ | | | 3.01 | | |
| | $R_{12}$ | plano | | | |
| 7 | | | 4.60 | 1.76182 | 26.5 |
| | $R_{13}$ | 91.740 | | | |
| 8 | | | 4.70 | 1.74100 | 52.7 |
| | $R_{14}$ | plano | | | | wherein:
numbers 7 and 8 refer to the lens elements in succession from the side of incident light;
spacing $d_6$ is the distance between lens elements 6 and 7; and
surfaces $R_{12}$-$R_{14}$ refer to the surfaces of the lens elements in succession from the incident light side.

4. The scan lens of claim 1 and further comprising a second cemented doublet opposite the first cemented doublet from the incident light side, the second cemented doublet including plano-concave and plano-convex lens elements with the cemented surface convex toward the incident light side.

5. The scan lens of claim 1 wherein the first meniscus lens element is a negative meniscus lens element.

6. The scan lens of claim 1 wherein the second meniscus lens element is a positive meniscus lens element.

7. The scan lens of claim 1 wherein the lens is an f/6.0 lens with numerical characteristics substantially as follows:

| Lens Element & Spacing | Surface | Radius (mm) | Thickness & Distance (mm) | $N_d$ | $V_d$ |
|---|---|---|---|---|---|
| | $R_{101}$ | −27.087 | | | |
| 101 | | | 4.10 | 1.80518 | 25.4 |
| | $R_{102}$ | −116.937 | | | |
| $d_{102}$ | | | 3.81 | | |
| | $R_{103}$ | −44.651 | | | |
| 102 | | | 9.04 | 1.77250 | 49.7 |
| | $R_{104}$ | −35.608 | | | |
| $d_{103}$ | | | 0.40 | | |
| | $R_{105}$ | plano | | | |
| 103 | | | 8.00 | 1.74950 | 35.3 |
| | $R_{106}$ | −55.189 | | | |
| $d_{104}$ | | | 0.26 | | |
| | $R_{107}$ | 74.844 | | | |
| 104 | | | 10.32 | 1.74100 | 52.7 |
| | $R_{108}$ | plano | | | |
| $d_{105}$ | | | 8.74 | | |
| | $R_{109}$ | −175.668 | | | |
| 105 | | | 5.48 | 1.80518 | 25.4 |
| | $R_{110}$ | 42.520 | | | |
| 106 | | | 9.20 | 1.74100 | 52.7 |
| | $R_{111}$ | plano | | | | wherein:
numbers 101-106 refer to the lens elements in succession from the side of incident light;
spacings $d_{102}$-$d_{105}$ refer to the distances between lens elements 101-105;
surfaces $R_{101}$-$R_{111}$ refer to the surfaces of the lens elements in succession from the incident light side;
$N_d$ refers to the refractive indices of the lens elements at the Sodium d line; and
$V_d$ refers to the Abbe numbers of the materials of the lens elements.

8. The scan lens of claim 7 and further comprising a second cemented doublet opposite the first cemented doublet from the incident light side, the second cemented doublet including plano-concave and plano-convex lens elements with the cemented surface convex toward the incident light side, with numerical characteristics substantially as follows:

| Lens Element & Spacing | Surface | Radius (mm) | Thickness & Distance (mm) | $N_d$ | $V_d$ |
|---|---|---|---|---|---|
| $d_{106}$ | | | 0.25 | | |
| | $R_{112}$ | plano | | | |
| 107 | | | 4.60 | 1.76182 | 26.5 |
| | $R_{113}$ | 93.003 | | | |
| 108 | | | 4.70 | 1.74100 | 52.7 |
| | $R_{114}$ | plano | | | | wherein:
numbers 107 and 108 refer to the lens elements in succession from the side of incident light;
spacing $d_{106}$ is the distance between lens elements 106 and 107; and
surfaces $R_{112}$-$R_{114}$ refer to the surfaces of the lens elements in succession from the incident light side.

9. An eight lens element 71.009 mm focal length f/6.0 telecentric scan lens having numerical characteristics substantially as follows:

| Lens Element & Spacing | Surface | Radius (mm) | Thickness & Distance (mm) | $N_d$ | $V_d$ |
|---|---|---|---|---|---|
| | $R_1$ | −27.309 | | | |
| 1 | | | 3.76 | 1.80518 | 25.4 |
| | $R_2$ | −118.949 | | | |
| $d_2$ | | | 3.78 | | |
| | $R_3$ | −44.651 | | | |
| 2 | | | 8.98 | 1.77250 | 49.7 |

-continued

| Lens Element & Spacing | Surface | Radius (mm) | Thickness & Distance (mm) | $N_d$ | $V_d$ |
| --- | --- | --- | --- | --- | --- |
| | $R_4$ | −35.608 | | | |
| $d_3$ | | | 0.51 | | |
| | $R_5$ | plano | | | |
| 3 | | | 8.13 | 1.74950 | 35.3 |
| | $R_6$ | −55.189 | | | |
| $d_4$ | | | 0.25 | | |
| | $R_7$ | 74.844 | | | |
| 4 | | | 13.53 | 1.74100 | 52.7 |
| | $R_8$ | plano | | | |
| $d_5$ | | | 8.65 | | |
| | $R_9$ | −175.668 | | | |
| 5 | | | 5.39 | 1.80518 | 25.4 |
| | $R_{10}$ | 40.287 | | | |
| 6 | | | 9.20 | 1.74100 | 52.7 |
| | $R_{11}$ | plano | | | |
| $d_6$ | | | 3.01 | | |
| | $R_{12}$ | plano | | | |
| 7 | | | 4.60 | 1.76182 | 26.5 |
| | $R_{13}$ | 91.740 | | | |
| 8 | | | 4.70 | 1.74100 | 52.7 |
| | $R_{14}$ | plano | | | | wherein:
  numbers 1-8 refer to the lens elements in succession from an incident light side;
  spacings $d_2$-$d_6$ refer to the distances between lens elements 1-5 and 6 and 7, respectively;
  surfaces $R_1$-$R_{14}$ refer to the surfaces of the lens elements in succession from the incident light side;
  $N_d$ refers to the refractive indices of the lens elements at the Sodium d line; and
  $V_d$ refers to the Abbe numbers of the materials of the lens elements.

10. An eight element 71.004 mm f/6.0 telecentric scan lens having numerical characteristics substantially as follows:

| Lens Element & Spacing | Surface | Radius (mm) | Thickness & Distance (mm) | $N_d$ | $V_d$ |
| --- | --- | --- | --- | --- | --- |
| | $R_{101}$ | −27.087 | | | |
| 101 | | | 4.10 | 1.80518 | 25.4 |
| | $R_{102}$ | −116.937 | | | |
| $d_{102}$ | | | 3.81 | | |
| | $R_{103}$ | −44.651 | | | |
| 102 | | | 9.04 | 1.77250 | 49.7 |
| | $R_{104}$ | −35.608 | | | |
| $d_{103}$ | | | 0.40 | | |
| | $R_{105}$ | plano | | | |
| 103 | | | 8.00 | 1.74950 | 35.3 |
| | $R_{106}$ | −55.189 | | | |
| $d_{104}$ | | | 0.26 | | |
| | $R_{107}$ | 74.844 | | | |
| 104 | | | 10.32 | 1.74100 | 52.7 |
| | $R_{108}$ | plano | | | |
| $d_{105}$ | | | 8.74 | | |
| | $R_{109}$ | −175.668 | | | |
| 105 | | | 5.48 | 1.80518 | 25.4 |
| | $R_{110}$ | 42.520 | | | |
| 106 | | | 9.20 | 1.74100 | 52.7 |
| | $R_{111}$ | plano | | | |
| $d_{106}$ | | | 0.25 | | |
| | $R_{112}$ | plano | | | |
| 107 | | | 4.60 | 1.76182 | 26.5 |
| | $R_{113}$ | 93.003 | | | |
| 108 | | | 4.70 | 1.74100 | 52.7 |
| | $R_{114}$ | plano | | | | wherein:
  numbers 101-108 refer to the lens elements in succession from an incident light side;
  spacings $d_{102}$-$d_{106}$ refer to the distances between lens elements 101-105 and 106 and 107, respectively;
  surfaces $R_{101}$-$R_{114}$ refer to the surfaces of the lens elements in succession from the incident light side;
  $N_d$ refers to the refractive indices of the lens elements at the Sodium d line; and
  $V_d$ refers to the Abbe numbers of the materials of the lens elements.

* * * * *